United States Patent
Safa

(10) Patent No.: US 7,664,924 B2
(45) Date of Patent: Feb. 16, 2010

(54) SYSTEM AND METHOD TO SECURE A COMPUTER SYSTEM BY SELECTIVE CONTROL OF WRITE ACCESS TO A DATA STORAGE MEDIUM

(75) Inventor: John Safa, Park Estate (GB)

(73) Assignee: Drive Sentry, Inc., Mountain View, CA (US)

( * ) Notice: Subject to any disclaimer, the term of this patent is extended or adjusted under 35 U.S.C. 154(b) by 0 days.

(21) Appl. No.: 11/858,752

(22) Filed: Sep. 20, 2007

(65) Prior Publication Data

US 2008/0114957 A1     May 15, 2008

Related U.S. Application Data

(63) Continuation-in-part of application No. 11/292,910, filed on Dec. 1, 2005.

(60) Provisional application No. 60/826,377, filed on Sep. 20, 2006.

(51) Int. Cl.
*G06F 12/14*     (2006.01)

(52) U.S. Cl. .............................. 711/163; 711/E12.091; 711/E12.093; 711/E12.096

(58) Field of Classification Search .................. 711/163
See application file for complete search history.

(56) References Cited

U.S. PATENT DOCUMENTS

| | | | |
|---|---|---|---|
| 5,410,700 A | | 4/1995 | Fecteau et al. |
| 5,778,432 A | * | 7/1998 | Rubin et al. ................. 711/135 |
| 5,825,877 A | | 10/1998 | Dan et al. |
| 5,974,549 A | * | 10/1999 | Golan ......................... 726/23 |
| 5,991,777 A | * | 11/1999 | Momoh et al. ............... 707/205 |

(Continued)

FOREIGN PATENT DOCUMENTS

GB     2402515 B1     12/2004

(Continued)

OTHER PUBLICATIONS

Norton Internet Security 2000. Manual [online]. Symantec Corporation, 1999 [retrieved on Jan. 29, 2008]. Retrieved from the Internet: <URL:http://webpages.charter.net/cwind/nis.pdf>.*

(Continued)

*Primary Examiner*—Reginald G Bragdon
*Assistant Examiner*—Larry T Mackall
(74) *Attorney, Agent, or Firm*—Ted Sabety; Sabety +associates, PLLC

(57) ABSTRACT

A system and method to securing a computer system from software viruses and other malicious code by intercepting attempts by the malicious code to write data to a storage medium. The invention intercepts the write access requests made by programs and verifies that the program is authorized to write before letting the write proceed. Authorization is determined by using the identity of the program as a query element into a database where permission values are stored. Depending on the presence or value of the permission value, write access is permitted or denied. Permission values can be set by the user, downloaded from a central server, or loaded into the central server by a group of users in order to collectively determine a permission value. The interception code can operate in kernel mode.

11 Claims, 8 Drawing Sheets

U.S. PATENT DOCUMENTS

| | | |
|---|---|---|
| 6,308,274 B1 | 10/2001 | Swift |
| 6,370,614 B1 * | 4/2002 | Teoman et al. ............... 711/113 |
| 6,434,639 B1 | 8/2002 | Haghighi |
| 6,941,470 B1 | 9/2005 | Jooste |
| 6,944,772 B2 * | 9/2005 | Dozortsev ................... 713/180 |
| 7,003,616 B2 | 2/2006 | Shimura |
| 7,188,215 B2 * | 3/2007 | Hooker ....................... 711/118 |
| 2002/0073072 A1 | 6/2002 | Fukumoto |
| 2003/0061504 A1 * | 3/2003 | Sprigg et al. ................. 713/200 |
| 2003/0093643 A1 * | 5/2003 | Britt, Jr. ..................... 711/170 |
| 2003/0195887 A1 * | 10/2003 | Vishlitzky et al. ............. 707/10 |
| 2005/0022011 A1 * | 1/2005 | Swander et al. ............. 713/201 |

FOREIGN PATENT DOCUMENTS

| | | |
|---|---|---|
| WO | WO 93/09498 | 5/1993 |

OTHER PUBLICATIONS

FileMon. [online]. SysInternals, Aug. 27, 2005 [retrieved on Jun. 3, 2008]. Retrieved from the Internet: <URL:http://court.shrock.org/sysinternals/>.*

Mamutu. [online]. EMSI software, Jun. 3, 2008 [retrieved on Jun. 3, 2008]. Retrieved from the Internet: <URL:http://www.mamutu.com/en/software/mamutu/>.*

Peter Szor, The Art of Computer Virus Research and Defense, Section 11.12, Addison Wesley Professional, Feb. 3, 2005, New York, ISBN 0-321-30454-3.

* cited by examiner

SYSTEM AND METHOD TO SECURE A COMPUTER SYSTEM BY SELECTIVE CONTROL OF WRITE ACCESS TO A DATA STORAGE MEDIUM

This application claims priority to U.S. application Ser. No. 11/292,910 filed on Dec. 1, 2005 as a continuation in part, and U.S. Application 60/826,377 filed on Sep. 20, 2006 as a continuation, which are both hereby incorporated by reference.

BACKGROUND AND SUMMARY OF THE INVENTION

The present invention relates to a method of controlling the writing of data to a storage medium such as a hard drive in a computer system by an application running in a memory of the computer system.

The use of computers for Internet and other communication purposes, particularly in relation to electronic mail and the downloading of applications over the Internet has led to the proliferation of so-called computer viruses. Whilst anti-virus programs have been developed to combat these, they can be relatively elaborate and expensive and usually operate to deal with an offending virus only after the operating system of the computer has been infected. There are so many variants of virus programs being released that anti-virus programs cannot identify new viruses quickly enough.

The present invention seeks to provide an improved method of preventing the infection of a computer by a virus program.

According to the present invention there is provided a method of controlling write access to a storage medium by monitoring an application; detecting an attempt by the application to write data to said storage medium; interrogating a rules database in response to said detection; and controlling write access to the storage medium by the application in dependence on said interrogation.

DETAILED DESCRIPTION OF THE PREFERRED EMBODIMENTS

Preferably the interrogation comprises determining the write access allowed for the application and controlling the write access in dependence thereon.

Preferably write access is controlled to one of a plurality of levels, the levels including a first level in which no write access is allowed, a second level in which full write access is allowed, and a third level in which write access is only allowed for at least one specified file extension.

Preferably where write access is controlled to the first level, the method further includes generating a prompt on a display requesting response from a user.

Preferably the user can respond to the prompt by choosing from a number of possible responses, the possible responses including a first response for allowing write access, a second response for blocking write access and a third response for allowing write access to a specific file type only.

Preferably the user can respond further by selecting from a plurality of further actions, the further actions including, storing the chosen response in the rules database; and applying the chosen response only for the current attempt by the application to write data to said storage medium.

Figure 1:
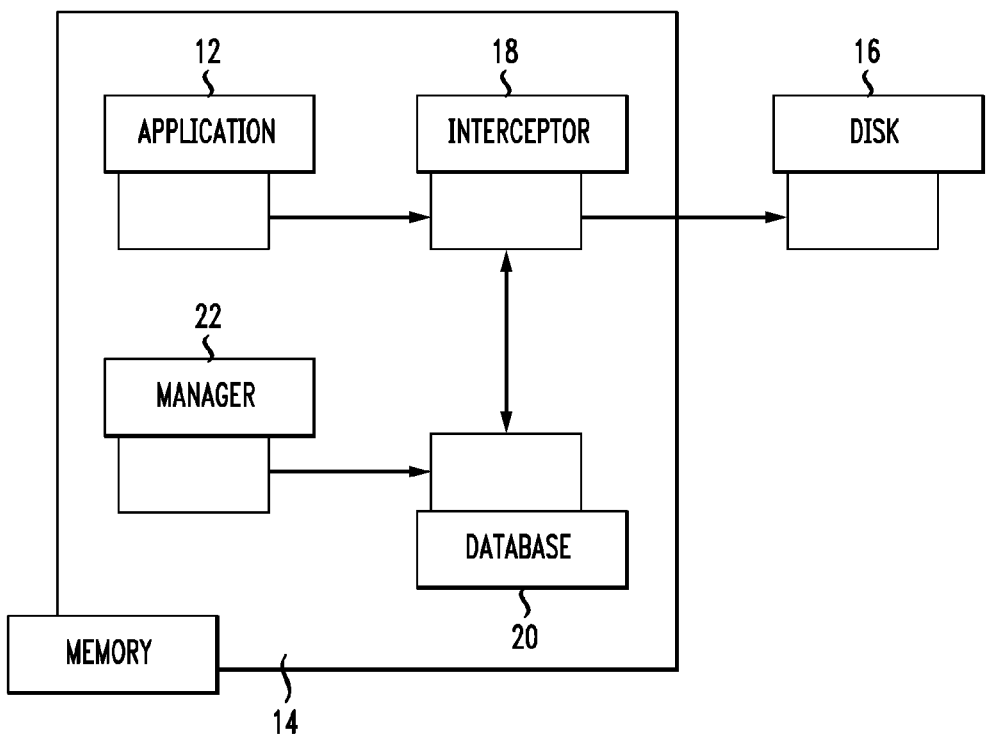
FIG. 1: is a process diagram showing the control of a write instruction of an application in accordance with a preferred method of the present invention.

Referring firstly to FIG. 1, this shows an application 12 which is running in a memory 14 of a computer system. The computer system also has a storage medium 16 which here is in the form of a hard drive or disc.

The typical computer is comprised of a central processing unit, a main memory, a mass storage device and input and output connections. The input and output include keyboards, monitors and network connections. The mass storage device can be a magnetic disk, optical disk or a large array of semiconductor devices. The main memory is typically an array of semiconductor circuits. The central processing unit is operatively connected to these components so that it can both control their activities and move data among the components. The central processing unit can load data off of the mass storage device and write it into main memory. This data can either be treated as a program or as data to be processed. If a program, the central processing unit passes control to the program data and executes the instructions encoded in the data. Program data can be an application servicing the user.

When the computer is first booted up it automatically loads an application 18 which is here termed as an "interceptor" program. This runs constantly in the background. As an alternative to being loaded on boot up of the computer, it can, of course, be run at the user's prompt at any time whilst the computer is operating. In addition, the interceptor program can run continuously in the background as a process, including as part of the computer operating system.

When the application 12 attempts to write data to the disc 16 the interceptor program 18 detects this and interrogates a rules database 20 to determine the authority of the application 12 to write to the hard drive 16. The database 20 is preferably encrypted and lists applications approved by the user with their level of write access. The term data is used here in its general sense to include any form of data including programs. The preferred number of possible write access levels for an application is three, being as follows:—

Level 0—this means that no write access to the hard drive 16 is allowed for the application 12.

Level 1—this means that full write access is allowed.

Level 2—the application is allowed write access to the hard drive 16 for specified file extensions only, (for example ".doc" file extensions for document files in Microsoft Office™) file extensions of data that can be written to the hard drive are also held in the database 20.

Level 4—The application can be granted to have access to a specific drive or directory. The database can contain corresponding references between applications and file types or file extensions that such application may write.

There are a number of rules which can be applied to the database 20 and these are controlled by a manager program 22 which can sit in the memory 14 alongside the interceptor program 18 and can also be run on start up of the computer or at any preferred time during operation of the interceptor program 18, running continuously in the background, including as part of the computer operating system.

Figure 2:
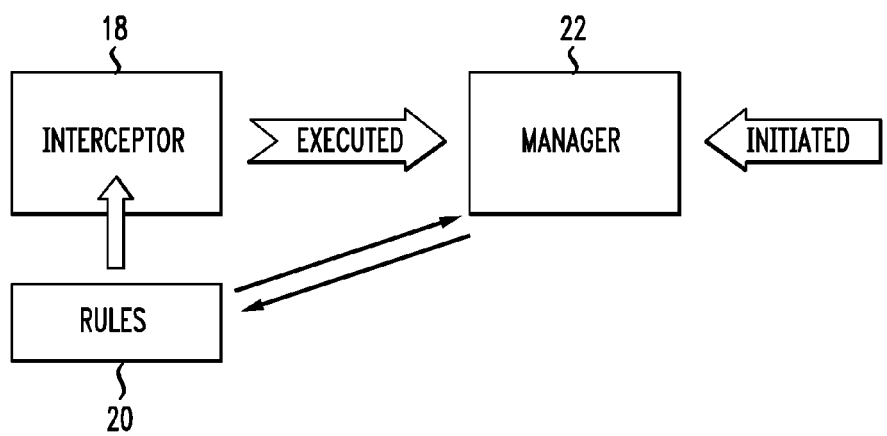
FIG. 2: is a process diagram illustrating an action of the preferred method according to the present invention.

FIG. 2 illustrates the interface of the manager program 22 with the rules database 20 and the system user.

When the interceptor program 18 detects that the application 12 is attempting to write to the hard drive 16 it initiates the loading and execution of the manager program 22. The latter interrogates the rules database 20 to determine the access level of the application 12 and controls the interceptor program 18 to allow or prevent the write action in dependence on the relevant rule in the rules database 20. If the application 12 is not listed in the rules database 20 or the particular write instruction is not allowed, the manager program 22 can generate a prompt signal to be displayed on the computer screen, requiring the user to make a decision on whether or not to allow the write instruction. This prompt can have a number of responses for the user to choose, such as "Allow write access", "Block write access" and "Allow write access to this file type only". Having chosen the response the user can also select one of a number of further actions as follows.

1 Store the response in the rules database—The response is stored in the rules database as a further rule to be applied to that application on all future write actions.

2 Block once the write action—This prevents the requested write action for this occasion only and further write attempts by the application again result in a user prompt.

3 Allow once the write action—This allows the requested write action but any future write requests for the application again result in a user prompt.

Thus, for example, if the application 12 is attempting to write a file to the hard drive 16 with a particular file extension, the rules database 20 can be updated such that all future attempts by the application 12 to write files of that same extension to the hard drive 16 would be automatically allowed or prevented or result in further user prompts.

Practitioners of ordinary skill will recognize that in some operating systems, including Windows™, file extensions can be arbitrarily applied to a file while the file contents are in fact something else. This common trick is used by virus writers to distribute an executable payload with an extension other then .exe (in the Windows case). Thus, users can be tricked into clicking on (in order to view) what appears to be a non-executable (a .jpg extension for a JPEG image, for example), but the computer, recognizing that internally, the file is an executable, will pass control to the program and launch it—thus propagating the virus. Therefore, where determining the "file extension" is referred to in this disclosure, it also includes detecting the actual type of file by examination of its contents, especially in the case where internally such file is an executable. Windows XP in a Nutshell, Second Edition, ©2005, O'Reilly Media, U.S.A is hereby incorporated by reference. Microsoft Windows Internals, 4th Edition: Microsoft Windows Server 2003, Windows XP, and Windows 2000, Mark E. Russinovich, David A. Solomon, Microsoft Press, Hardcover, 4th edition, Published December 2004, 935 pages, ISBN 0735619174, is hereby incorporated by reference.

The manager program 22 can also be loaded and executed by the user at start up of the computer or at any time in order to scan the hard drive 16 for programs to build a full rules database 20. The manager program 22 can also be prompted by the user to display a list of programs within the rules database 20 with the access level of each program, giving the user the option to delete, add or modify each entry. In addition, a rules database can be pre-created, or incrementally improved and distributed to the computer electronically, either embodied on a disk or electronically over a data network. Rules determined by users can also be uploaded to a central depository as well. Rule updates can be downloaded into the computer. Rules can also be included with installation files for the particular application that the installation file is creating. In this case, the installation process has to be sufficiently certified that program installation does not corrupt the database by incorporating bogus rules that service virus writers. Certification can include digital signing protocols between the invention and the installing program and other modes of verifying authenticity, including remotely accessed keys or trusted third parties accessed over a network. Rules can also be derived by examining operating system data where such data presents correspondences between installed program applications and file types and extensions. In this case, other authentication may be necessary in order to avoid virus writers from inserting bogus file type associations within the operating system databases. Practitioners of ordinary skill will recognize that authentication can include cyclic redundancy checking (CRC) and other types of numerical algorithms that detect when tampering has occurred.

Figure 3:
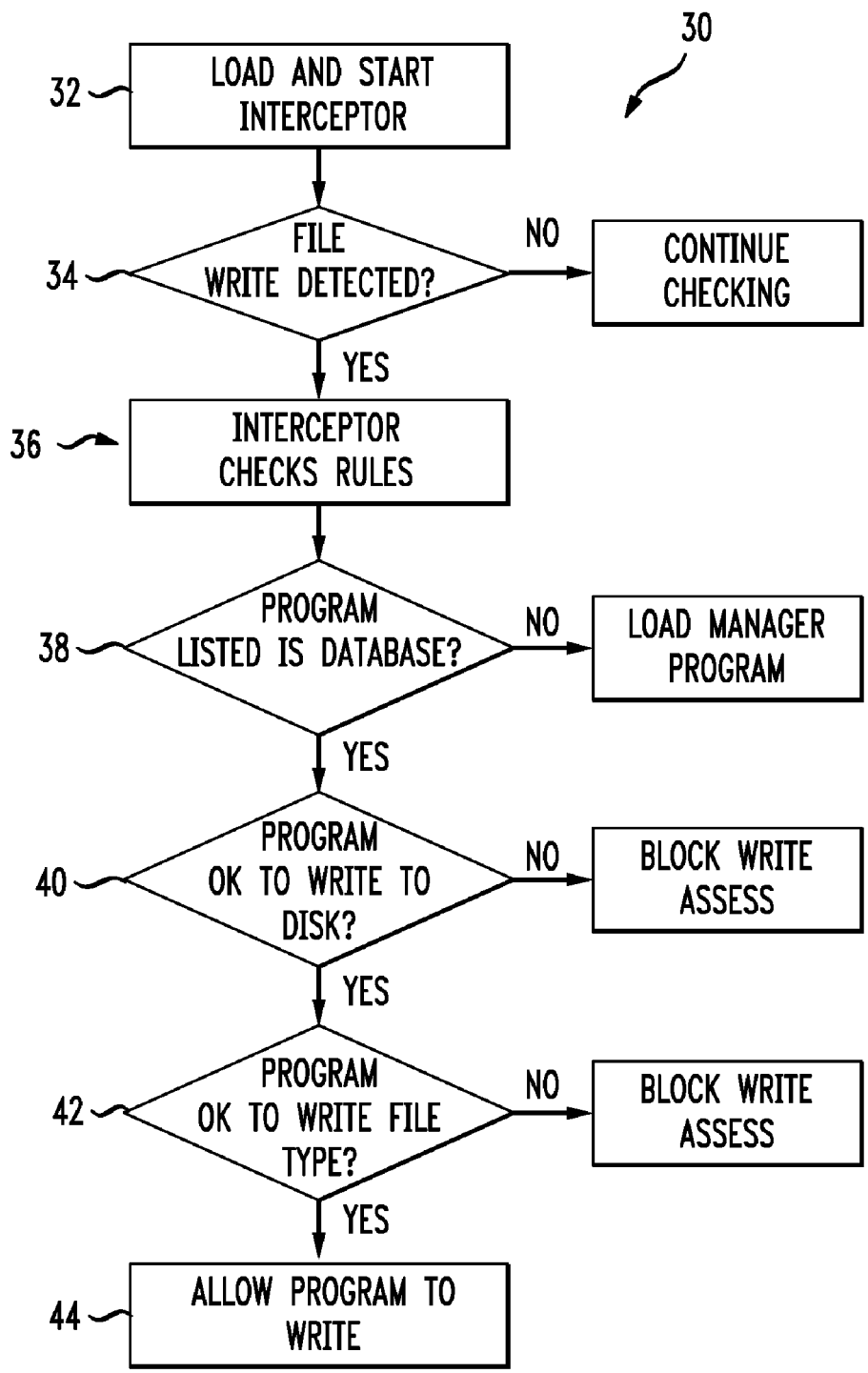
FIG. 3: is a flow diagram of the preferred method.

In FIG. 3 a flow diagram 30 is shown which illustrates the method followed on initiation 32 of the interceptor program 18. In the preferred embodiment, the interceptor module is a kernel mode driver which has a higher level of access to the Windows file system and system resources. Once initiated the interceptor program 18 waits in a monitoring step 34 during which it monitors for any file write operation to the hard drive 16. In the absence of a file write operation, the interceptor program 18 remains in the monitoring step 34 and continues to check for a file write operation.

If a file write operation is detected then write is pended in a queue and the interceptor program 18 proceeds to complete a series of rule checking steps 36 by calling a kernel mode rules checker. Initially the rules checker checks if the application 12 making the write attempt is listed in the rules database 20. The rules database can be stored on the local personal computer, client computer or remote server. In the preferred embodiment, a recent list of rules that have been interrogated may also be held in a cache in kernel memory cache which speeds up applications that are frequently accessing the drive. If the application 12 is not listed then the interceptor program 18 initiates the manager program 22 to allow the user to make a decision about the correct way in which to proceed. Otherwise, if the application 12 is listed then the interceptor program 18 proceeds to the next rule checking step.

Figure 7:
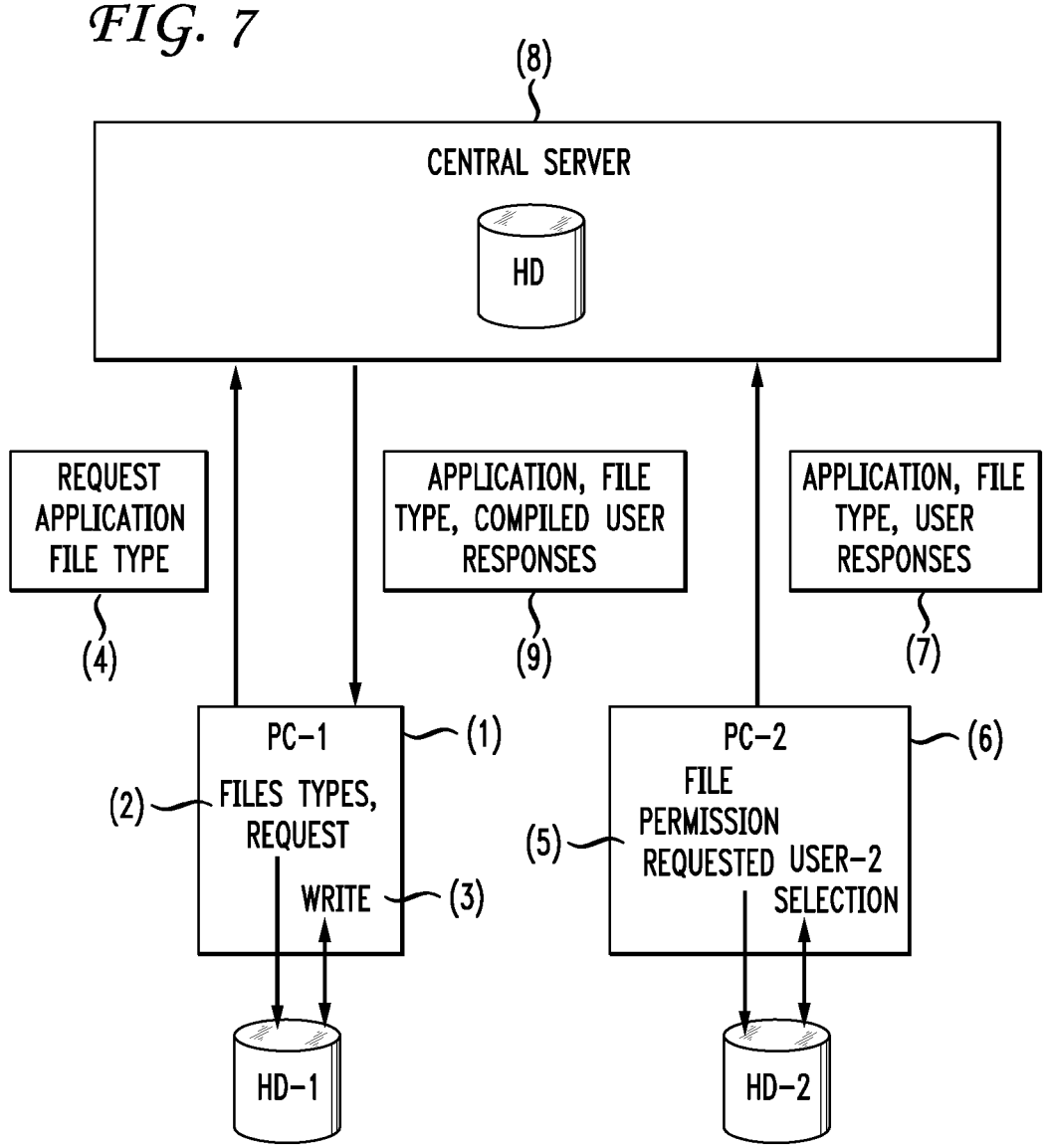
FIG. 7: depicts the connection between two computers and a central server and the distribution of permission values from one computer to the other through the server.

On finding the application 12 listed in the rules database 20, the interceptor program 18 goes on to check if the write privileges of the application 12. Initially the hard drive write privilege of the application 12 is checked. If the application 12 does not have privilege to write to the hard drive then write access is blocked. Otherwise, the interceptor program 18 checks if the application 12 has write privilege for the specific file type, directory or filename which the write attempt has been made to. The manager program can, at this step, check the data to be written or the file to which such data is being appended to determine if the contents of the file are the appropriate file type, that is, to avoid improper creation of portable executable (PE) or other files whose contents are intended to be used as computer program code. PE files are files that are portable across all Microsoft 32-bit operating systems. The same PE-format file can be executed on any version of Windows 95, 98, Me, NT, and 2000. This is supplemental to checking the file extension in order to avoid the virus propagation technique described above. If the application 12 does have privilege to write to the specific detected file type or file extension then the write operation is allowed. Otherwise write access is blocked. A signature of the application, which is a number that is calculated to determine whether a code block has been tampered with, is also stored in the rules database. Practitioners of ordinary skill will recognize that CRC, or cyclic redundancy checks or other types of signature checking, for example, MD5 may be used. "Applied Cryptography" by Bruce Schneier, John Wiley & Sons, 1996, ISBN 0-471-11709-9 is hereby incorporated herein by reference for all that it teaches. Practitioners of ordinary skill will recognize that these techniques can also be used to authenticate the rule database that the manager program uses to verify the permission of the application. This allows trusted programs to be allowed access to the drive if their signature/structure hasn't changed, that is, the program has determined that the there has not been tampering with the application. An example is that a trusted application could be infected with a Trojan or virus and still have access to the drive based on its earlier approval being registered in the database. The manager program can use a number of criteria for the drive access of an application. The rules can be based on file name, directory name, file type, file extension, registry access and creation of specific file types. FIG. 7 shows a basic flow-chart that further explains the system control flow.

If no rules are found for an application then a prompt module can ask the user what access level or permission they wish to allow for the application. This can involve denying or blocking the application write for that instant or for ever. The user can also get information from other users responses to a specific application by data being downloaded from a central server over a data network, both a proprietary network as well as the Internet.

The system also allows feedback on the users responses to write requests to be uploaded and stored on a central server. This stores if the user allowed or denied the application write, or what level of permission was applied and if it was denied, the reason why. The reason the user denied it can be a number of responses such as 'virus', 'Trojan' etc. The applications name and signature are stored with the reason.

An embodiment of the invention can enforce strict rules on applications writing to disk drives, memory devices, drivers, external devices or removable media. The rules can be implemented when the application first writes to the drive or via a graphical user interface or application main window. The interface permits the creation and management of a set of sophisticated rules that determine what files types, directory or drive the application can or can't write.

As a result, the invention permits a user's computer to prevent write access (in real-time) to disk or other memory by malicious programs writing to applications or destroying files. Viruses such as Nyxem can be blocked in real-time when they attempt to write over popular file types such as documents and spreadsheets.

The invention can prevent disk drive space from being wasted by blocking applications from saving downloaded media used for advertising. Typical files can be HTML pages, Flash Movies and graphics files, which, by file type, can be blocked from being saved by browser application like FireFox or Internet Explorer. Small files containing indicia about a user's web usage history, also called cookies, can be block from being written to the disk drive by blocking them being saved into a specific directory. Specific file attachments can be blocked in order to prevent applications like instant messaging tools or email clients such as screen savers and other executables from being saved.

Watch File Access:

In another embodiment, the invention features a powerful file and registry watch which overrides the default application rules by allowing the user to monitor attempted changes of critical system files or registry keys in real-time for any attempted writes. This prevents viruses and other malicious code overwriting or damaging valuable data or modifying settings in the system registry. The user can separately specify to automatically block, allow or prompt before each action occurs. In addition, the user can specify wildcards such as *.DOC to prompt when certain files types are about to be written to and then allow the user to be prompted before the write occurs. This functionality prevents Viruses and Trojans from changing registry settings to allow themselves to start-up automatically. It also prevents Viruses and Trojans changing system files such as HOST settings. It also protects files from Virus attacks by checking before documents, spreadsheets or other valuable data are modified.

The system can also protect an entire directory by watching files being changed. If write access is approved for a device or hard drive, certain directories or files can be specified that still require a manual permission for that directory. This ensures that spurious writes to a directory or dangerous behaviour of a virus are blocked before their most destructive act takes place.

Real-time Logs and Charts:

In another embodiment of the invention, the software embodying the invention allows the user to view a log of all applications writing out files and registry keys. This allows the user to check what is actually being written by each application. The user can right click on any file(s) in the log list and then either open them for viewing or delete them from the drive. The activity log can also display a real-time graph of statistics that show the file and registry writes and any rules that have been modified.

In another embodiment of the invention, the system can provide additional information about applications by connecting to a service embodied in the central database accessible by a communications network. The database is populated with descriptions and recommended actions for popular applications and processes. Service also displays on the user's computer screen statistical information on what other system users have allowed or denied writing to their computer.

1: DriveSentry detects an unknown program writing to a drive. A pop window is displayed and the user has a choice to block or allow the process from writing. The user can also click an info button which displays another screen.

2: The user can click an info button which displays the DriveSentry advisor window. A connection is made to our server and displays statistical information about the application. The dialog displays a bar chart which shows a % of the number of people that have blocked or allowed the application in the past. Another chart breaks down the reason why people blocked the application.

3: The user can then choose to block or allow the program. If the user clicks the block button then a smaller window is displayed which prompts for a reason they blocked the program. If the user doesn't deselect the 'upload feedback' button then the data on if they allowed or blocked it (inc reason) is uploaded to the central server and added to the database for statistical records on the application.

Caching:

In another embodiment of the invention, each write to disk requested by a process has to be checked by polling the system's database. That is, the identity of the process or its parent application has to be used to query the database to find what access rules apply. If the database of rules is entirely on the disk drive, this will slow down performance of a computer because for every disk access, there is another disk access required. In order to speed up this process, it is desirable to create a cache of some of the rules in the computer's main memory so that the database rules can be accessed more quickly. By way of example, the cache can be stored the name of the action (e.g. write), name of the application or process and the access writes, e.g. file type or file name or device type. The cache is typically populated by the most recently used rules. Practitioners of ordinary skill will recognize that there are many strategies for populating a cache in a computer memory. One way is to store in the cache the last distinct N database query results, where N is selected by the practicality of how large a cache in main memory can be supported. Alternatively, the cache can be populated with those rules associated with any active application, and the section of the cache devoted to a terminated application being flushed. The location of the cache is typically stored in a secure location on the computer. This typically is the kernel memory, where driver code is stored. The kernel memory is set up by the operating system to be non-writable by processes not associated with that section of kernel. In this case, the kernel memory devoted to this cache is associated only with the security system embodying the invention that is running as an application or process. Alternatively, the memory allocated to the cache can be encrypted with a check key like a CRC or MD5 so that the application can verify that the rules recovered from the encrypted cache have not been corrupted by some other application or process or virus. Any other method of securing the rule cache from tampering may be used.

Vault Data Storage

The Vault system allows applications and data to be recovered under certain circumstances if they are destroyed by a virus or other malicious code.

Figure 4:
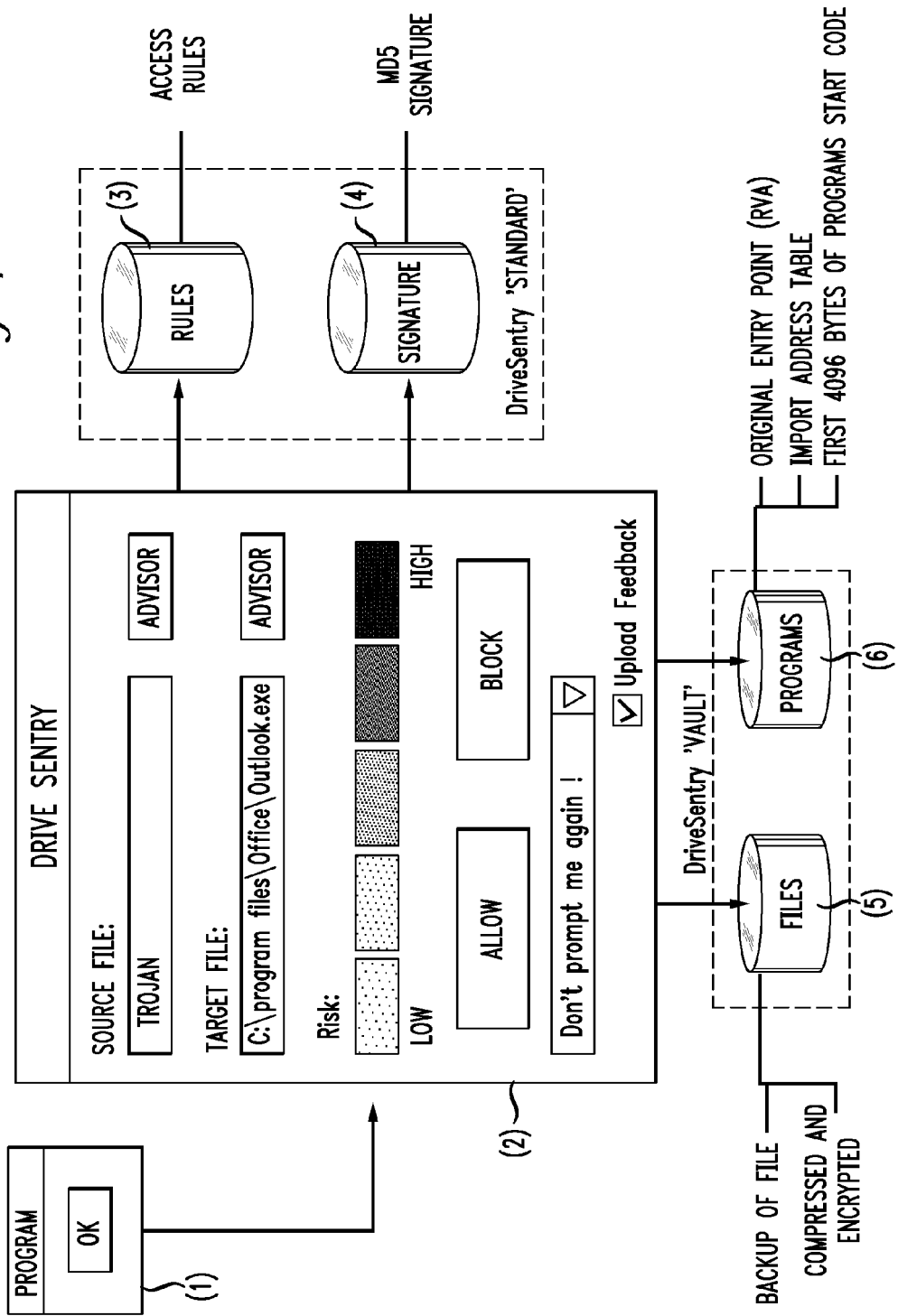
FIG. 4: shows the user interface querying the user for a decision regarding an application.

Referring to FIG. 4, an application (1) runs on the user's computer and its' signature (4) and access rules (3) are read via the security system (2) to check that it's not been modified and it has access to write to the drive.

The user can select any file such as a document or spreadsheet to be encrypted and compressed in a secure location as they are processed in real-time by the system. The user can at anytime access the 'Vaulted' copy and restore the file. The system can also store specific loader data on an application that can be easily used to repair an application if it becomes infected by a virus or other malicious code.

In the vault application, the system can save part or all of an encrypted copy of an executable. This can include a CRC (cyclic redundancy check) or MD5 code or similar code that tests the integrity of the block of code. Upon launch of the original executable (that is, the first copy not the vault copy), the CRC or MD5 of the original executable file is checked. If there is an error, then it means the first copy of the executable is corrupted. At that point, the vault system can be called to decrypt its encrypted copy of the executable. If the entire executable has been placed in the vault, then the entire first executable copy can be replaced. If only a portion of the executable has been placed in the vault, the system can do a byte for byte comparison of that block between the decrypted vault copy and the corrupted first copy. Where there are discrepancies, the portions of the first copy can be replaced. At that point, the same CRC or MD5 can be checked to see if the portion of the executable in the vault has fully repaired the first copy of the executable. If so, then the executable is launched. If not, then the process fails and the application is stopped. Practitioners of ordinary skill will recognize that the process as applied to executables can also apply to data files, provided that if the data file is corrupted and cannot be repaired, then an error may be returned to the application rather than stopping the application.

In one embodiment of the invention, some processes can be specified to have full privilege. For example, some operating system processes must be given broad access without checking the database for permission. For example, in Windows, the security software can specify that certain Windows processes, that is, processes spawned by Windows for the operating system itself, rather than for an application, are writing to important Windows files. This might occur when the Windows operating system is updating its own code. In this case, the security system will permit writes to the *.ini, *.sys and *.exe modules that comprise the Windows operating system.

In another embodiment of the invention, special attention is paid toward writes to any of the data files that define the configuration of a specific instance of the operating system itself. In one example, the Windows Registry is a database that stores configuration data about the computer it is running on. Practitioners of ordinary skill will recognize that hidden processes can be launched by inserting commands into the Registry, including in entries such as "run once" or "run". These entries cause processes to launch on boot-up without any user interaction. The invention is arranged to check for writes to these critical operating system files and specific entries in the operating system files. If a write is approved, the system will log the write: that is, it will store in a data file the specific data being written into the file and its destination in the file. In addition, the system will place in the log the value of the data in the file that was overwritten. In the event a user or the system discovers that the operating system file has been corrupted, then the log file can be used by the system to detect what corrupt data was written to the operating system file. The log file can also be used to restore the affected operating system file.

In another embodiment of the invention, critical writes to devices and drivers can be trapped by the system and similarly checked for their integrity or permission. This includes checking writes to any removable devices that may be attached to the computer temporarily.

In another embodiment of the invention, the database that the system builds up that notes whether an application has permission to write or other levels of access to resources on the computer can be shared among multiple users. In this case, all or part of the database associated with the system, where permissions or denials are stored, can be uploaded to a central database by means of typical data communications networks, including the Internet. The database is stored on a memory device that is operably attached to a computer that is further operably attached to the data network. In this embodiment of the invention, each update to a user's database with regard to application permissions is uploaded to update the central database. Additional information may be stored in the central database, for example, the number of users who has approved and denied the applications' request for the compute resource. Further, when a user is confronted with an application access request that the user has not seen before and where no recommendation or action data (that is to accept or deny permission) is within the database, the system can query the central server for the data it has regarding that application. This data can be transmitted to the user's computer and the information displayed, as shown on FIG. 5. The user can then decide which action to take, and such decision can then be inserted into the local database on the user's computer.

Referring to FIG. 7, there are two or more computers, (1) and (6), each using an instance of the invention, embodied as software running on the computers. In addition, there is a central server (8) housing a database on a disk drive. The second user's computer running an embodiment of the invention (6) may encounter a file access request by an unknown application (5). As described herein, this will result in the user interface popping up and requesting that the user respond as to whether to allow or block the access and it can also ask the user the reason, for example, the user may know that the identified application is a virus, Trojan or some other type of program. This information is stored in the local computer's database as described herein. In addition, this information can be transmitted from the second computer (6) to the central server (8) by the formation of a message data packet that is comprised of the name of the application or the application's executable filename, or process name, the file type accessed, and the user's response, for example, allow or deny (7). The server (8), when it receives such a packet will update its database as follows: The server will search its database for a record corresponding to that application or the application's executable filename. If no record is found a new record is created that includes the information provided by the second user, and that one allowance was permitted (or denial, as the case may be). As additional users report on the same application or executable file or process, their responses are combined with the data present in that data record. As allowances are received, the number of allowances are incremented. As denials are received, the number of denials are incremented. Over time, the central server (8) has combined the responses of many users to the same application, process or executable request.

Figure 5:
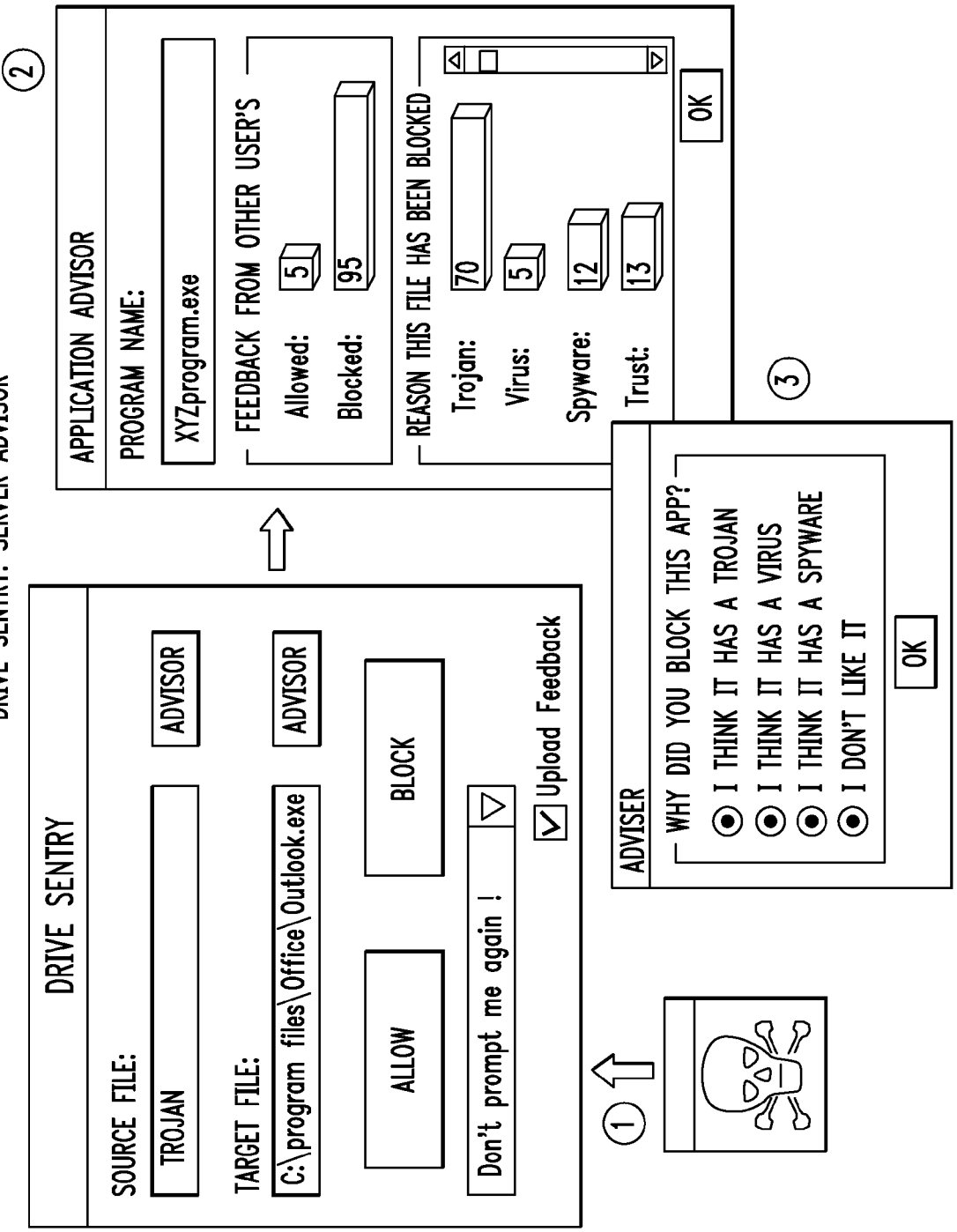
FIG. 5: shows the user interface indicating the collective response of other users to the same application request and logical location to store vault data.
Figure 6:
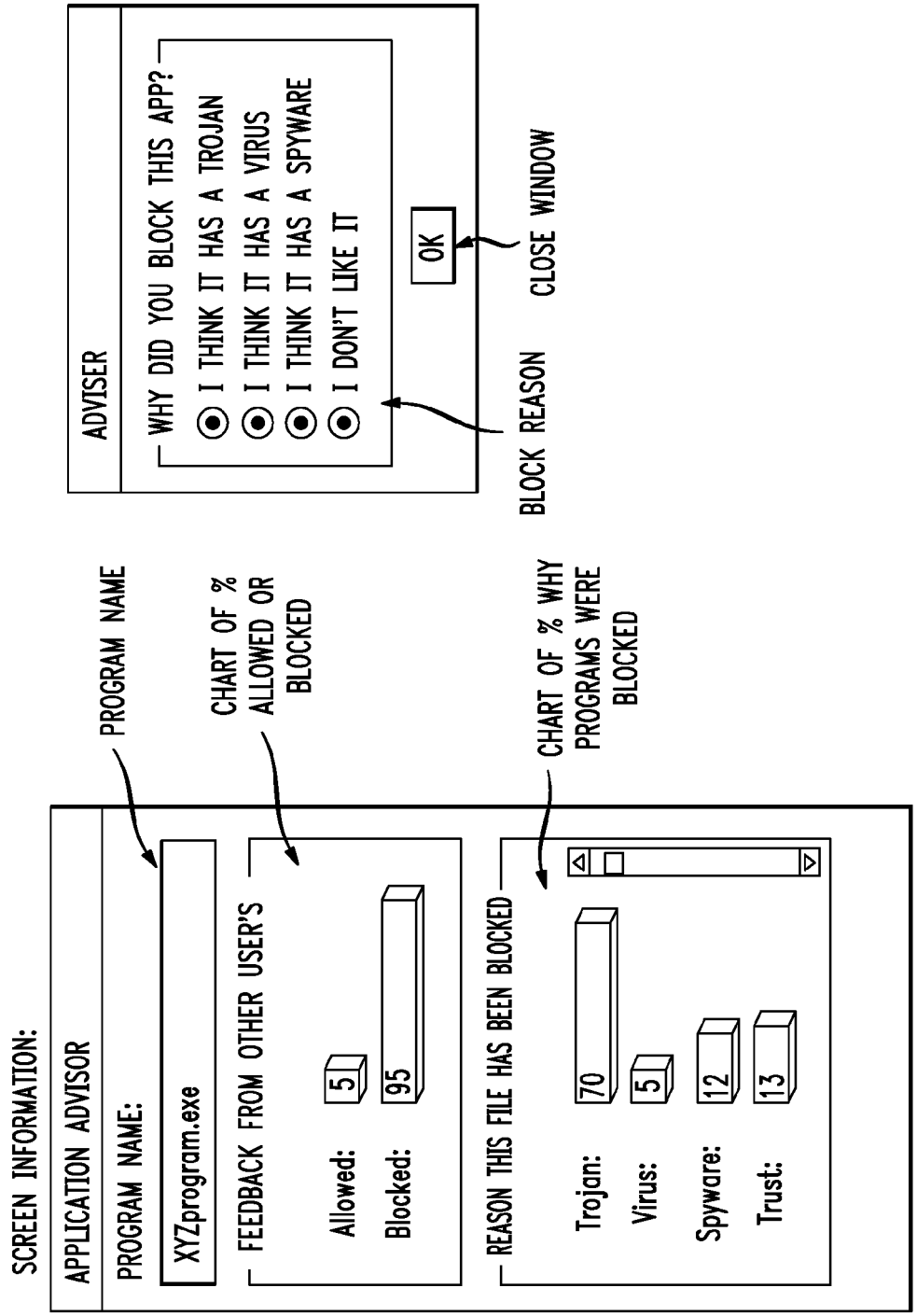
FIG. 6: shows a close-up of the user interface indicating the collective response of other users to the same application request.

When the first user's computer encounters the same application or executable file or process name for the first time, the local embodiment of the invention initiates a local search for that application, executable or process name (2). If there is no local entry for that application, executable or process (3), then the first computer makes a request (4) to the central server (8) to see if the central server has any information about that application, executable or process. The central server searches its database, and finding the compiled data described above, sends a message data packet (9) back to the first computer. The first computer then presents this data to the first user by means of a typical computer interface, including a graphical interface as shown in FIG. 5. The user's selection of what to do is then entered into the local computer's database.

Practitioners of ordinary skill will recognize that the local database of application names, executable names and process names and their corresponding permissions and restrictions for certain file types and directory locations can be immediately populated upon installation of the software that embodies the invention. In addition, the database can be updated automatically or upon a user request to the central server. In this case, the central server would hold a database containing authorized or fully vetted applications, executables and processes that have been checked by the software manufacturer or some trusted third party. A manufacturer of an application can create a file listing all executables that comprise the manufacturer's application and the file type or file name and directory where such executable is supposed to appropriately write data. This information can be incorporated into the central server's database. The manufacturer can transmit to the central server (8) a request to include certain information into the database. This data will be indicated as actions recommended by the manufacturer of that specific application. As a result, this data can be used to automatically populate the local database residing on the computers, (1) and (6). In addition, when the first computer encounters a request from an application for the first time, the central server (8) can deliver a response (9) that indicates that the manufacturer of the software either recommends an allowance, or that the manufacturer does not list the action as required by an uncorrupted copy of their software.

In another embodiment, the system installed on a particular user's computer has a unique identifier, identifying that instance of the program. When the system sends update data to the central database server, it also sends the indicia of identity. The central database server will only upload permission data for a given application from a specific indicia of identity once. By means of that mechanism, the only way an application can earn multiple approvals, on the order of hundreds or thousands, is if hundreds or thousands of distinct installations of the security system send the central database an approval for that application. This mechanism prevents a hacker or other nefarious actor from sending multiple approvals in order to trick the system.

In another embodiment of the system, a software producer, that is, a legitimate software developer, may analyze the operation of one or more of its application products to detect the resource accesses that would be detected and checked by the security system. The software developer can then compile a data file where there are two associated entries: the resource being accessed and the application making the access request. Further information can be provided, for example, the identity of the process, the type of access and other typical information. This data file can then be converted into permission data that can be stored in the central database. The permission data can be downloaded to a user's computer upon installation of the specific software product. Associated with this process can be further security checks. For example, the installed software can send a security check number, like a CRC or MD5 code to the central server. This can be checked for integrity before the permission data is downloaded to the user's computer.

In another embodiment, users are able to rate other user's submissions for accuracy or report them to DriveSentry administrators for moderation. Administrators associated with the central server or a service business relying on the central server, can maintain and add entries to the database. An incentive can be provided to users in order that they participate effectively, for example to provide the top 5 submitters in a month to receive a cash prize.

Figure 8:
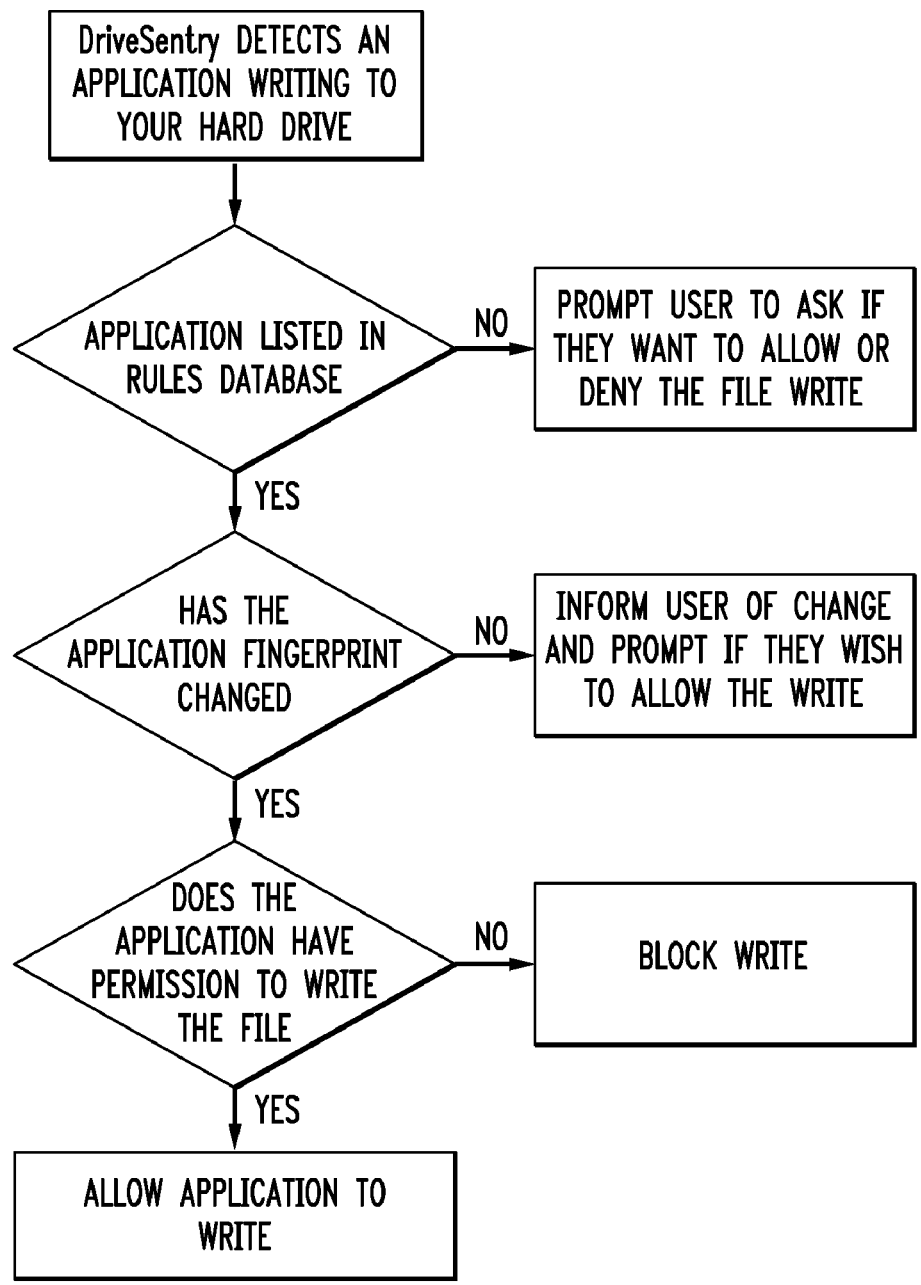
FIG. 8: depicts an alternative control flow in accordance with the invention.
Figure 9:
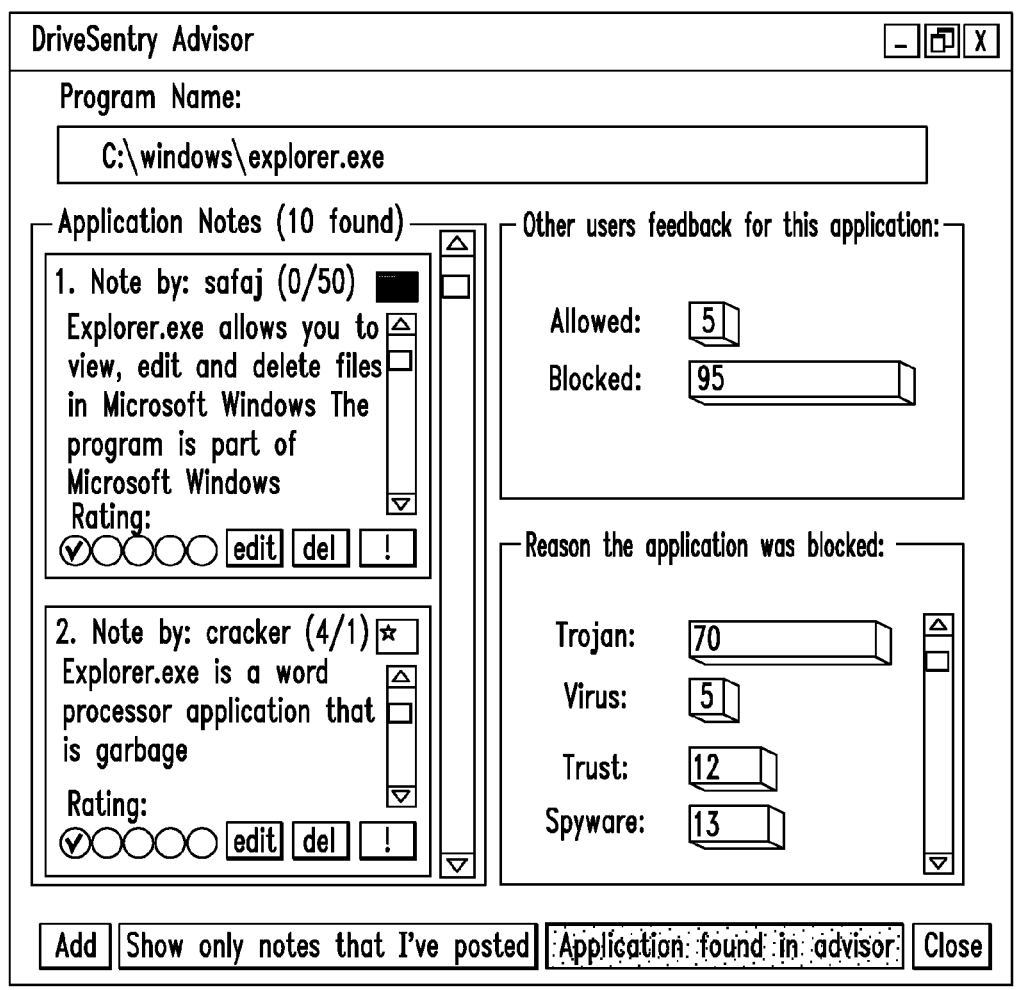
FIG. 9: depicts the user interface showing the reason a particular user responded to the query.

Upon the user submitting a report, the system running on the user's computer would launch a interface window that would display notes that have been uploaded by other users and service administrators. Each note could be rated for accuracy by other users and notes would be ordered by their score with the highest being displayed first. A user would also be able to add, edit and delete their notes. If a note was deemed inaccurate, libellous or inflammatory then it would be able to be reported to service administrators. Reported notes would be reviewed daily and deleted. The user interface displays could appear as shown in FIG. 8.

The user that submitted the note followed by the number of rejected notes they had and the total amount e.g. Safaj (0/50). An icon would represent that the user was an administrator and their location using a flag symbol. The note would be scrollable and contain the description of the application. Notes would be able to be written in multiple languages and filtered upon. The bottom of the note would contain a row of icons that would indicate the average rating of the note. Other users could click on the rating bar and submit their score to the overall accuracy of the note. If the user was the author of the note then they could edit and delete notes. The user could report other users notes to an administrator by click on a button on the note.

Multiple notes would be displayed from different users and sorted by their rating from other users. The user would be able add new notes. The user could also filter on notes that they had posted.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims.

What is claimed:

1. In a computer comprising a storage medium and an application running on said computer, a method of controlling write access to said storage medium by said application comprising:
    detecting an attempt by the application to write data to said storage medium;
    in response to said write attempt, attempting to retrieve a permission value from a database comprised of data elements encoding at least one permission value associated with one or more applications;
    in the case that no permission value for the running application is found in the database, transmitting to a central server operatively connected to the computer and to at least one additional computer, a query comprised of an indicia of identity associated with said running application;
    receiving from said central server, data that represents the collective response of the user of the at least one additional computer to requests by the same application running on said at least one additional computer to access the storage medium that comprises said at least one additional computer.

2. The method of claim 1 further comprising displaying on the user interface of said computer graphical forms representative of said collective response data.

3. The method of claim 1 where the data that represents the collective response data includes a percentage of other computer users who have approved the application writing to the storage medium associated with their respective at least one additional computer.

4. The method of claim 1 where the data that represents the collective response data includes a number which is the number of other users that have approved the application writing to the storage medium associated their respective at least one additional computer.

5. The method of claim 1 where the data that represents the collective response data includes at least one statement characterizing the reason that said at least one additional computer user selected a particular permission value.

6. The method of claim 5 where the reason is a spyware.

7. The method of claim 5 where the reason is a virus.

8. The method of claim 5 where the reason is a trojan.

9. In a computer comprising a storage medium and an application running on said computer, a method of controlling write access to said storage medium by said application comprising:
    detecting an attempt by the application to write data to said storage medium;
    in response to said write attempt, attempting to retrieve a permission value from a database comprised of data elements encoding at least one permission value associated with one or more applications;
    in the case that no permission value for the running application is found, transmitting to a central server operatively connected to the computer a query comprised of an indicia of identity associated with said running application;
    receiving from said central server information collective response data of at least one other computer user's to the request by the same application running on said other computer user's computers to access the storage medium that comprises said at least one other computer user's computers;
    receiving from said central server information transmitted to said central server, said information comprising other user's critique of said at least one other computer user's response.

10. A system comprised of a data storage medium, a central processing unit and a main memory, where said central processing unit executes any of the methods of claims 1-8 or 9.

11. A data storage medium containing digital data that, when loaded into a computer and executed as a program, causes the computer to execute any of the methods of claims 1-8 or 9.

* * * * *